United States Patent Office 3,834,922
Patented Sept. 10, 1974

3,834,922
PRODUCTION OF CHLORINE-CONTAINING COPPER PHTHALOCYANINES
Edward E. Jaffe, Union, N.J., assignor to E. I. du Pont de Nemours and Company, Wilmington, Del.
No Drawing. Original application Nov. 11, 1971, Ser. No. 197,978, now Patent No. 3,770,765. Divided and this application July 2, 1973, Ser. No. 375,942
Int. Cl. C08h 17/14
U.S. Cl. 106—288 Q                  2 Claims

ABSTRACT OF THE DISCLOSURE

Chlorine-containing pigmentary copper phthalocyanines are prepared via the phthalonitrile synthesis using as the solvent a member from a specified group of organic sulfones. The product may be used as such or as a stabilizer for chlorine-free copper phthalocyanine pigment.

Cross Reference to Related Application

This application is a division of application Ser. No. 197,978 filed Nov. 11, 1971, now U.S. Pat. 3,770,765.

BACKGROUND OF THE INVENTION

British Pat. 1,073,348 describes a technique for the direct manufacture of pigmentary chlorinated copper phthalocyanines by reacting a phthalonitrile, cupric chloride, and a tertiary aromatic amine in nitrobenzene as an inert solvent. While the technique would appear to be most attractive in that the need for a particle size reduction step is obviated, the use of a solvent having such a strong characteristic odor combined with a low degree of water solubility presents extreme difficulties for a commerical operation. Attempts have been made to operate such a process using solvents other than nitrobenzene, but these have, as noted in the British patent, been unsuccessful in that a pigmentary reaction product does not result.

SUMMARY OF THE INVENTION

In accordance with the present invention it has been found that the aforementioned disadvantages associated with the direct production of a chlorine-containing pigmentary copper phthalocyanine via the phthalonitrile synthesis are overcome by carrying out the reaction in a solvent medium which is a dialkyl sulfone of 2–4 carbon atoms or a cyclic sulfone of the formula

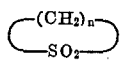

wherein $n$ is an integer of 4–5. Especially preferred solvents for use in accordance with the invention are tetramethylene sulfone and dimethyl sulfone.

The utility of the particular sulfone solvents leading to the direct production of chlorinated copper phthalocyanine is surprising since numerous other commercial solvents, including various highly polar solvents as well, fail to yield pigmentary products when used in a similar way.

It is a further finding of the invention that a chlorine-free copper phthalocyanine pigment can be stabilized against particle growth by the presence therein of 5–25 weight percent, based on the chlorine-free phthalonitrile pigment, of a product synthesized in accordance with the aforementioned process using one of the specified organic sulfones as the solvent. The stability of such a product is still further enhanced if it additionally contains 2–20 weight percent, based on the chlorine-free phthalocyanine pigment, of a calcium rosinate.

DETAILED DESCRIPTION OF THE INVENTION

A number of significant processing and product advantages accrue with the utilization of the above described class of organic sulfones as solvents in which to effect the reaction between a phthalonitrile, a cupric chloride and a tertiary aromatic amine so as to produce a chlorinated copper phthalocyanine. On the one hand these organic sulfones are generally free of an objectionable odor and tend to be highly miscible with water, so that recovery of the chlorinated copper phthalocyanine products is greatly facilitated. In addition to the fact that pigmentary products are obtained directly, the products themselves are also crystal stable and highly resistant to flocculation when used in coating compositions, equalling or in some cases exceeding in these respects commercial grades of copper phthalocyanine pigments prepared using ordinary particle size reduction techniques.

As above described, the organic solvents employed in accordance with the invention for carrying out a reaction between a phthalonitrile, cupric chloride and a tertiary aromatic amine are either (a) dialkyl sulfones of 2–4 carbon atoms, such as dimethyl sulfone and diethyl sulfone, or (b) cyclic sulfones of the formula

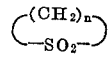

wherein $n$ is an integer of 4 to 5, thus tetramethylene sulfone or pentamethylene sulfone. It is significant that diphenyl sulfone fails to directly yield pigmentary chlorinated copper phthalocyanine by the same reaction.

While in general it is preferred to carry out the reaction of the invention using unsubstituted phthalonitrile so as to produce partially chlorinated copper phthalocyanines of 3 to 7 weight percent chlorine, i.e., monochloro copper phthalocyanine, it is entirely practicable to use phthalonitriles having 1 to 4 chlorine atoms per molecule to produce the more highly chlorinated species.

The tertiary aromatic amine reactant should, in respect of the tertiary nitrogen, be relatively free from steric hindrance. For this reason it is desired that the tertiary aromatic amine should be one in which the carbon atoms adjacent the tertiary nitrogen and not a part of a fused ring are free of substituents. Pyridine and quinoline are particularly useful examples of tertiary aromatic amines that may be so employed.

The use of cupric chloride is necessary for the direct attainment of a chlorinated copper phthalocyanine in a pigmentary form according to the invention. Cuprous chloride may be substituted in part but the major molar proportion of the total copper salts so employed should be supplied by the cupric chloride. The utilization of hydrated copper salts, indeed the presence of water in any form in the reaction mixture, should be avoided as such will tend to cause formation of non-pigmentary products.

Ammonium molybdate is a known catalyst for the phthalonitrile synthesis but its use in the present invention is wholly unnecessary, apparently because the tertiary aromatic amine functions in part as a catalyst.

In general it is advantageous to carry out the preparation of the copper phthalocyanine using a mole ratio of the phthalonitrile to tertiary aromatic amine in the range of 4:1 to 35:1. The ratio of the cupric chloride, plus other copper salts if used, to phthalonitrile should be at least about stoichiometric, i.e., 1 to 4 as usual, although an excess of the former is not objectionable and will generally tend to provide higher yields. The proportion of organic sulfone solvent in the reaction mixture is not critical to the reaction as such, although some losses in yield may be noted if unduly high or low amounts are used.

Temperatures as low as 150° C. are operable for the production of the chlorine-containing copper phthalocyanines in accordance with the invention, but it is generally preferable in order to achieve satisfactory yields of product that the reaction be performed at temperatures on the order of 170 to 190° C. Temperatures as high as 300° C. may be used but some weakening of product strength may be noted. As little as one-half hour at the required temperature can give good yields of pigmentary products but the preferred reaction time is on the order of 1 to 4 hours.

The chlorine-containing copper phthalocyanine products of the invention, of course, may be used as such for the coloring of paints, plastics, films and the like. They are also useful, however, in the stabilization of chlorine-free copper phthalocyanine pigments, either of the $\alpha$ or $\beta$ form, such as those typically produced by the phthalic anhydride/urea synthesis. For this purpose it is preferable to employ 5 to 25 weight percent, based on the chlorine-free copper phthalocyanine pigment, of the reaction product. A further enhancement in stability is obtainable if there is also included in the composition 2 to 20 weight percent, based on the chlorine-free copper phthalocyanine, of a calcium rosinate such as the calcium salt of hydrogenated rosin. It is merely necessary to combine the components in the desired proportions, e.g. by standard ball milling procedures, in order to effect the stabilization.

The following examples illustrate the invention and the advantages thereof. Parts and percentages are by weight unless otherwise indicated.

Example 1

Into a round-bottom flask equipped with an agitator, thermometer, and drying tube, the following chemicals are charged:

125 mls. tetramethylene sulfone,
16 grams (0.125 mole) phthalonitrile,
8.8 grams (0.0654 mole) anhydrous $CuCl_2$, and
1.25 grams (0.0158 mole) pyridine.

The mass is stirred and, over a period of about one-half hour, is then heated to 180–190° C. This temperature is maintained for about five hours. During the heat-up period, at one point the solids are nearly in solution and copper phthalocyanine begins to form when the temperature reaches about 160° C. The reaction mixture is then cooled to about 40° C.

The cooled mixture is diluted with 200 ml. methanol and stirred until uniform. The product is recovered by filtration, washed with some alcohol and then washed with water until chloride-free. The product is dried at 85° C. and is found to weigh 16.4 grams.

On analysis the pigmentary product shows 6.99% chlorine. By X-ray diffraction analysis, the crystal form is shown to be gamma monochloro copper phthalocyanine.

The pigment is rated excellent in terms of strength, intensity and flocculation resistance. In these respects it compares favorably to a commercial copper phthalocyanine pigment of similar chlorine content.

Example 2

The procedure of Example 1 is followed through the first paragraph thereof, i.e. through the point of cooling the reaction mixture to 40° C. The mixture is then diluted with a solution of 10 ml. concentrated $H_2SO_4$ in one liter of water and the resulting suspension boiled with open steam for one-half hour. The hot suspension is filtered and the solid is washed with hot water until free of acid and chloride. After drying at 82° C., the yield is 15.5 g. The chlorine content in the product is 6.1%. The product shows essentially the same characteristics as that of Example 1.

Example 3

Following the same procedure as given in Example 1, except using only half the amount of $CuCl_2$ (i.e. 4.4 g.= 0.0327 mole), 10.5 grams of pigmentary product is obtained having a chlorine content of 3.4%. In terms of pigmenting strength the resulting product is superior to a commercially available semichloro copper phthalocyanine noted for good texture characteristics.

Example 4

This example shows that the sequence of ingredient addition can be changed without significant effect on quality or yield.

In a round-bottom flask, 125 ml. tetramethylene sulfone,
4.4 grams (0.0327 mole) anhydrous cupric chloride, and
1.25 ml. (0.0158 mole) pyridine are heated with stirring to 180° C. The copper chloride-pyridine complex goes almost completely into solution during this heat-up. With the temperature at 180° C., 16 grams phthalonitrile is added over a five minute period. The temperature is then maintained at 180° C. for five hours, and the pigment product recovered according to the procedure given in Example 1. The yield of pigmentary product is 10.8 grams and the chlorine content is 3.1%. This product is comparable in quality to the product of Example 3.

Example 5

This example shows the use of quinoline as the tertiary base in the synthesis. The following ingredients are mixed in a round-bottom flask and stirred and heated to 180–190° C.:

125 ml. tetramethylene sulfone,
16 grams (0.125 mole) phthalonitrile,
8.8 grams (0.0654 mole) anhydrous cupric chloride, and
2.04 grams (0.0158 mole) quinoline.

When the temperature reaches 150–160° C., the copper phthalocyanine product begins to form. The synthesis is completed as in Example 1, to yield 13.5 grams of pigmentary product having a chlorine content of 6.3%.

In an alkyd vehicle, the product shows strength comparable to standard pigmentary products.

The pigment prepared according to this example, although not as strong in tinctorial properties, is of softer texture than the pyridine-catalyzed product of Examples 1 through 3. The product prepared using quinoline, as in this example, is especially suitable, therefore, for use in pigmentation of plastics such as polyvinyl chloride.

Example 6

In this example dimethyl sulfone is used as the reaction medium.

In a round-bottom flask 125 grams dimethyl sulfone (solid) is heated to 70° C., and to it is then added 8.8 grams (0.0654 mole) anhydrous cupric chloride and
1.25 grams (0.0158 mole) pyridine.

The mixture of ingredients is heated to 100–110° C. in order to melt the sulfone. At this time, 16 grams (0.125 mole) phthalonitrile is added and the temperature raised, with stirring to 180–190° C. and maintained at this level for three and one-half hours. The mixture is then cooled to about 80° C. and diluted with 200 ml. methanol. To dissolve the total amount of sulfone, the mixture is subsequently washed with one and eight-tenths liters of methanol and then with water until free of chloride. The yield of pigmentary product is 15.4 grams and the chlorine content is 7.02%. The product is found to be more intense and stronger than a commercial semichloro copper phthalocyanine.

Example 7

The preparation of polychloro copper phthalocyanine according to the process of the present invention is shown in this example.

The following ingredients are mixed in a round-bottom flask and heated with stirring to 180–190° C. over a one-half hour period.

125 ml. tetramethylene sulfone
33.2 grams (0.125 mole) tetrachlorophthalonitrile
8.8 grams (0.0654 mole) anhydrous cupric chloride
1.25 grams (0.0158 mole) pyridine The product begins to form when the temperature reaches 180° C. The temperature is maintained at 180–190° C. for three and one-half hours, and the product is recovered and washed according to the procedure of Example 1. Yield of pigment is 22.9 grams and the chlorine content is about 50%. The pigmentary product is as strong as a commercial polychloro copper phthalocyanine but is less intense. It is identical to a commercial polychloro copper phthalocyanine product in its infra-red spectrum and X-ray diffraction pattern.

Example 8

Crystal stabilization of a commercial α-copper phthalocyanine pigment is effected by the addition, based on the commercial pigment, of 15% of the gamma monochloro copper phthalocyanine product of Example 1, and 10% of a calcium salt of hydrogenated rosin. The components are intimately blended by ball milling to form a pigment composition that retains maximum strength, i.e., detectable particle growth does not occur, when used in paint compositions together with titanium dioxide or aluminum powder. The α-copper phthalocyanine component does not, as would unstabilized α-copper phthalocyanine, convert to the β-phase when boiled in xylene.

What is claimed is:

1. As a novel product, a chlorine-free copper phthalocyanine pigment stabilized by the presence in admixture therewith of 5–25 weight percent, based on the phthalocyanine pigment, of the product obtained by reaction of a phthalonitrile containing 0–4 chlorine substituents, cupric chloride, and a tetriary aromatic amine in which the tertiary nitrogen is a part of the aromatic ring and in which carbon atoms adjacent the tertiary nitrogen and not a part of a fused ring are free of substituents, at a temperature of 170–300° C. in an organic solvent comprising a dialkyl sulfone of 2–4 carbon atoms or a cyclic sulfone of the formula

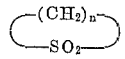

wherein $n$ is an integer of 4–5.

2. Product according to Claim 1 further containing 2–20 weight percent, based on the phthalocyanine pigment, of a calcium rosinate.

References Cited

UNITED STATES PATENTS

| 3,041,192 | 6/1962 | Brouillard et al. | 106—288 Q |
| 3,770,765 | 11/1973 | Jaffe | 260—314.5 |

DELBERT E. GANTZ, Primary Examiner

J. V. HOWARD, Assistant Examiner

U.S. Cl. X.R.

106—308 Q